United States Patent
Marl et al.

(10) Patent No.: US 7,219,140 B2
(45) Date of Patent: May 15, 2007

(54) CONFIGURATION AND MANAGEMENT SYSTEMS FOR MOBILE AND EMBEDDED DEVICES

(76) Inventors: Dennis Craig Marl, 2412 E. Interlake Blvd., Seattle, WA (US) 98112; Vinay Deo, 16302 NE. 50th Way, Redmond, WA (US) 98052; Tak Chung Lung, 12323 NE. 97th St., Apt. R, Kirkland, WA (US) 98033; Jeffry Blaine Phillips, 14234 79th Ave. NE., Bothell, WA (US) 98011; Michael Thomson, 16620 NE. 48th St., Redmond, WA (US) 98052

( * ) Notice: Subject to any disclaimer, the term of this patent is extended or adjusted under 35 U.S.C. 154(b) by 806 days.

(21) Appl. No.: 10/183,916

(22) Filed: Jun. 26, 2002

(65) Prior Publication Data

US 2003/0126236 A1    Jul. 3, 2003

Related U.S. Application Data

(60) Provisional application No. 60/338,777, filed on Dec. 5, 2001.

(51) Int. Cl.
*G06F 13/15*    (2006.01)

(52) U.S. Cl. ............... 709/219; 709/224; 709/246; 713/200

(58) Field of Classification Search ............... 709/219, 709/224, 246; 713/200
See application file for complete search history.

(56) References Cited

U.S. PATENT DOCUMENTS 6,018,619 A * 1/2000 Allard et al. ............... 709/224
6,185,625 B1 2/2001 Tso et al.
6,272,536 B1 8/2001 van Hoff et al.
6,278,449 B1 8/2001 Sugiarto et al.
6,314,565 B1 11/2001 Kenner et al.
6,480,901 B1 * 11/2002 Weber et al. ............... 709/246
6,857,009 B1 * 2/2005 Ferreria et al. ............ 709/219
2001/0021664 A1 9/2001 Kikinis
2001/0032254 A1 10/2001 Hawkins
2002/0078371 A1 * 6/2002 Heilig et al. ............... 713/200

FOREIGN PATENT DOCUMENTS

| US | EP1087597 | 3/2001 |
|---|---|---|
| WO | WO0041119 | 7/2000 |
| WO | WO0076172 | 12/2000 |
| WO | WO0079406 | 12/2000 |

OTHER PUBLICATIONS

Notification of the First Office Action From the Patent Office Of The People's Republic Of China. 5 pages, no date.

* cited by examiner

*Primary Examiner*—Jungwon Chang
*Assistant Examiner*—Jinsong Hu (57) ABSTRACT

A system management framework is described for use with a limited-resource client such as a hand-held device. The framework includes a client proxy implemented apart from the client device. The client proxy is configured to communicate with the client device and to emulate a full-functioned client computer on behalf of the client device.

38 Claims, 6 Drawing Sheets

CONFIGURATION AND MANAGEMENT SYSTEMS FOR MOBILE AND EMBEDDED DEVICES

RELATED APPLICATIONS

This application claims priority to U.S. Provisional Application No. 60/338,777 entitled "Configuration & Management System for Mobile & Embedded Devices" by Craig C. Marl et al. and filed on Dec. 5, 2001.

TECHNICAL FIELD

This invention relates configuration management systems, and in particular to the use of such systems with limited resource and/or non-compatible client devices.

BACKGROUND

Computers have become an integral part of the workplace. In many organizations, nearly every employee uses at least one computer. As a result, large businesses typically operate and maintain a very large number of computers. In businesses such as these, it becomes important to automate maintenance chores to any extent that is possible.

Fortunately, local area networks (LANs) and wide-area networks (WANs) have also become common, allowing an organization's various computers to take advantage of centrally provided computer services such as user authentication, file-sharing, email, and various other types of services.

Configuration management systems represent one type of service that can be effectively used in a networked environment to automate the maintenance and management of various disparate computers within an organization. Such a service provides tools for centralized software distribution, asset management, and remote troubleshooting with respect to desktop computers, servers, and server applications. Microsoft® Corporation's "Systems Management Server" is an example of a system designed for this purpose.

Figure 1:
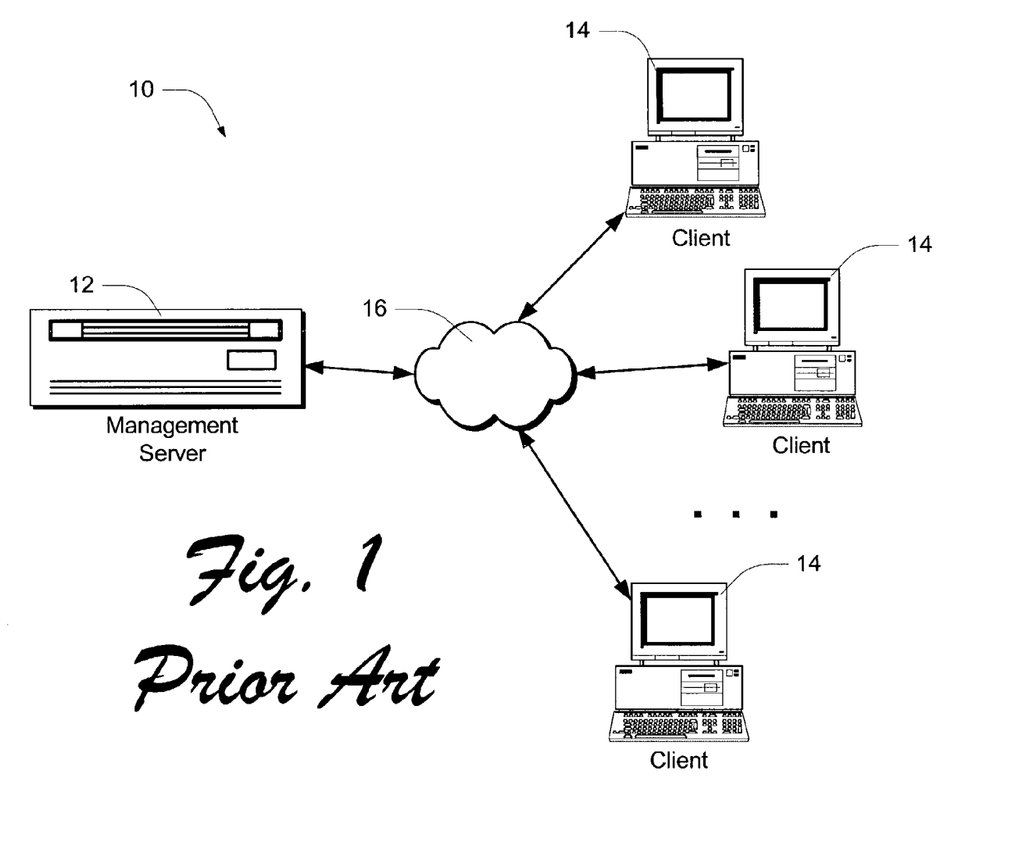
FIG. 1 is a diagram of a prior art system management framework.

FIG. 1 shows a simplified example of computer system 10 in which automated configuration management is implemented. Such a system includes a management server 12 and a plurality of client computers 14. The clients 14 can communicate with each other and with management server 12 through a local-area network or wide-area network 16.

Although it is represented as a single device in FIG. 1, management server 12 might comprise a plurality of individual computers or servers, which might be located in close proximity to each other or might be located at various different locations.

Modern operating systems and application software often provide client-side support for automated configuration management of computers on which the operating systems and application software reside. For example, the Microsoft Windows XP® family of operating systems maintains detailed inventories of both hardware and software components in a database that allows for programmatic query and data collation, both from components within the computer itself and from other computers. Within the Windows® environment, this feature is known as Windows Management Instrumentation or WMI. Change and configuration management software can utilize WMI information to obtain inventories of individual computers and to evaluate whether a computer's configuration should be updated or changed.

In addition to operating system support, individual client computers 14 are typically configured with special-purpose software to support automated configuration management.

Such software is normally designed as part of a particular vendor's implementation of an automated configuration management system, for example as part of the Microsoft® Systems Management Server product. The special-purpose software works in conjunction with the client computer's operating system to perform various functions in conjunction with management server 12. Thus, the overall framework of an automated configuration management system includes both server components and client components.

Figure 2:
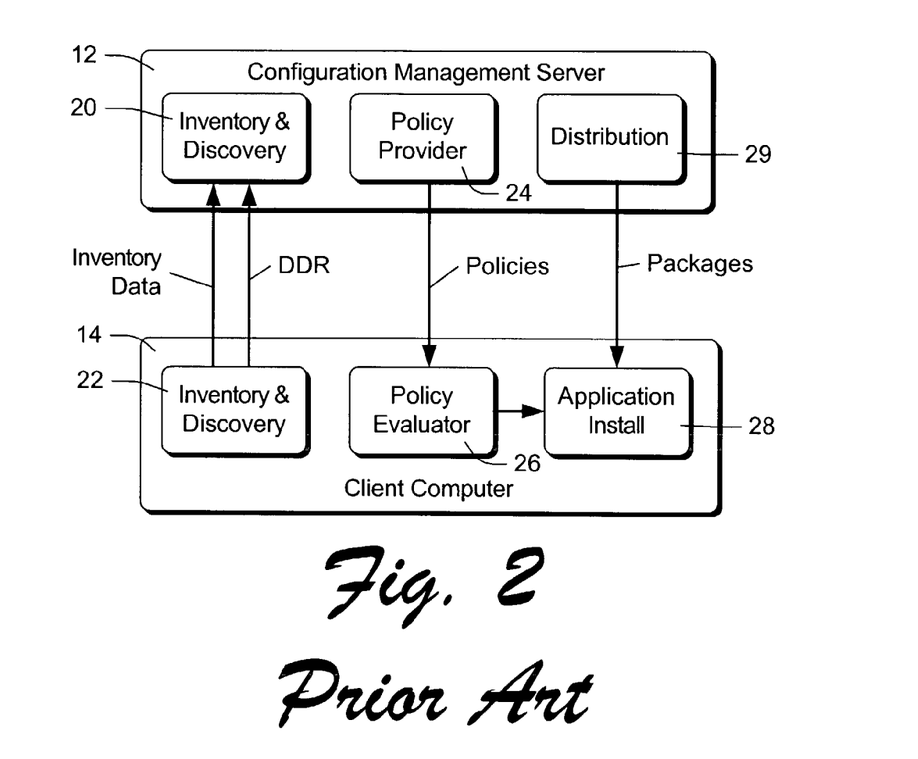
FIG. 2 is a block diagram showing logical components of a configuration management server and a client computer as used in a prior art system management framework such as the one shown in FIG. 1.

FIG. 2 shows simplified logical components of the configuration management framework implemented by the Microsoft® Systems Management Server product, including components of server 12 and components of implemented within client 14. The illustrated components relate to the inventory and software distribution features of the framework.

Management server 12 has a server inventory and discovery component 20 that operates in conjunction with a client inventory and discovery component 22 is residing on client 14. The client inventory and discovery component 22 gathers identification information and hardware and software inventories of client computer 14, assembles this information into data structures, and provides this information to server inventory and discover component 20 of server 12. The identification information uniquely identifies the client on the managed network and includes properties such as NetBIOS name, IP address, etc. This information is packaged and reported as data structures referred to as discovery data records or DDRs. The management server maintains this information in a database to facilitate asset management functions. Within client 14, much of the information is gathered using the WMI functionality of the Windows XP® operating system. Communications between server 12 and clients 14 utilize predetermined protocols that are proprietary to the particular implementation of the automated configuration management system.

Client computers potentially collect and report over 200 properties, including details such as:
Number and size of disk drives
Type and speed of processor
Amount of memory
Operating system
Monitor and display settings
Computer name and IP address
Information about connected peripherals
Network type
BIOS information In addition, each client computer reports a list of all software applications installed on the client, including manufacturer and version information.

Management server 12 includes a policy provider 24 that distributes policies to managed computers such as client 14. Policies indicate configuration settings and software distribution. An example of configuration setting policy is a rule such as "the password on this client computer must be 7–10 characters long and include a non alphabetic character". Software distribution policies indicate software packages that are available for download and installation, and also include information indicating which types of client can download and install the indicated software packages. A software package is a collection of files, along with instructions for downloading and installing the files.

Client 14 has a policy evaluator 26 that receives the policies from server 12 and evaluates those policies to determine which are targeted to client 14. When policy evaluator 26 determines that a policy is directed to client 14, the policy evaluator passes this information to the appropriate component for action. Configuration setting policies are implemented in a variety of ways—some require changes in the registry, some require making calls to the WMI. If the policy is of software distribution type, then it is passed to an application installation component 28 on client 14. Installation component 28 examines the policy information and determines how to download the associated software package. It then connects to a distribution point 29 associated with server 12 and downloads the software package. After downloading the package, the application installation component 28 installs the packaged software in accordance with the information contained on the downloaded software package.

Existing automated configuration management systems such as the Microsoft® System Management Server work well in the traditional networked environment shown in FIG. 1, where the managed computers comprise desktop or other full-functioned computers. However, there is a growing trend for individual employees within an organization to utilize portable computing devices of more limited functionality than conventional desktop computers. Specifically, handheld devices known as personal digital assistants (PDAs) are becoming very widely used, and their users often connect such devices to corporate networks for tasks such as viewing email or synchronizing contact lists. Network connection can be through an associated desktop computer, or might be though independent network connection, including wireless and/or remote means of access.

Although many organizations do not officially provide technical support for handheld devices such as PDAs, their help desks are receiving an increasing number support calls relating to these devices. Such calls often relate to configuring the handheld devices and to obtaining new updates of applications that are installed on the devices.

There are many environments where computer or computer-like devices having less than full desktop functionality are used in large numbers. Factory automation controllers, electronic point of sale terminals, gas station pumps, etc. are examples of commonly used devices that are frequently networked, but do not possess the full functionality and resources of a traditional desktop computer. Microsoft® Corporation has designed a special version of its Windows® operating system for such limited-resource devices, know as the Windows CE® operating system.

In the past, limited resource devices such as PDAs and the other examples mentioned above have not been able to participate in automated configuration management. Existing configuration management solutions typically impose fairly significant processing tasks on the managed client computers, and the required client-side software is typically unable to run on the limited-resource devices such as PDAs. Client software specifically designed for these devices could conceivably be designed for use with existing configuration management systems, but would likely push or exceed the limits of computational resources available on these devices.

SUMMARY

A system management framework for use with a limited-resource client includes a client proxy implemented apart from the client device. The client proxy is configured to communicate with the client device and to emulate a full-functioned client computer on behalf of the client device. Specifically, the client proxy has a policy evaluator that receives policies from a configuration management system and that evaluates the policies to determine their applicability to the client device. If the client proxy determines that a policy is applicable to the client device, the client proxy provides instructions to the client regarding how to apply new settings or how new software packages are to be downloaded and installed.

DETAILED DESCRIPTION

Figure 3:
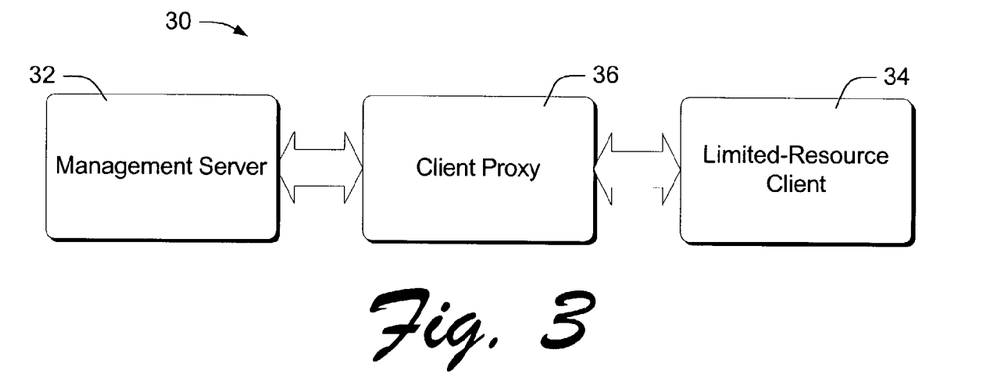
FIG. 3 is a block diagram of a system management framework in accordance with an embodiment of the invention.

FIG. 3 shows a top-level representation of a system management framework 30. Framework 30 comprises a configuration management system or server 32, a client device 34, and a client proxy 36. Configuration management server system 32 in the described embodiment comprises a Microsoft® System Management Server (SMS) installation as described above, although the techniques described herein can be implemented in conjunction with automated management systems from other manufacturers.

Configuration management system 32 is configured to communicate with and manage multiple compatible client computers as described above. When such client computers are full-functioned computers such as traditional desktop computers, the client computers run special-purpose software (typically called management system client agents or client components) as described above to provide compatibility with the functionality provided by the configuration management system. In the example shown by FIG. 3, however, client device 34 is a limited-resource device upon which it is impossible, impractical, or undesirable to run the normal client components of the automated configuration management system. Limited-resource devices include handheld computers, mobile devices, or other computer or computer-like device having limited resources and functionality as compared to a traditional, full-functioned desktop computer. Examples of such devices include PDAs, factory automation controllers, electronic point of sale terminals, gas station pumps, mobile telephones, etc. These devices typically run under an operating system that imposes less overhead and provides less functionality than a traditional desktop computer operating system. The Windows CE® operating system is an example of an operating system that is frequently used in conjunction with limited-resource computers such as those mentioned above.

Because of its limited functionality and resources, and its inability to run the standard client software of a configuration management system, client device 34 is considered for purposes of this discussion to be non-compatible with configuration management system 32—it does not run software that would allow direct communication with and management by configuration management system 32. Rather, client proxy 36 emulates a compatible, non-limited-resource client computer on behalf of the non-compatible client device 34 to allow the configuration management system to manage the non-compatible client device. Management of the client device includes the ability to maintain inventory information regarding the device and to add applications to and remove applications from the client device.

Client proxy 36 is a software component that is implemented apart from limited-resource client device 34, for example on a computer that is part of management system 32, on some other centralized server or computer, or on a host desktop computer that is associated with client device 34 for synchronization purposes. It is connected for communications with management system 32 by means of a network connection or other means. Client proxy 36 communicates with management system 32 as a managed client, appearing to management system 32 as a normal, full-functioned client. Thus, it is possible to utilize a standard configuration management system 32, with minimal changes in the server portion of the product, in order to support limited-resource clients.

Client proxy 36 communicates with client device 34 by means of a wired network connection, a wireless connection, or an HTTP proxy connection through a host computer (such as a desktop computer associated with the client device for synchronization purposes). For management purposes, client device 34 communicates with client proxy 36 rather than directly with configuration management system 32.

The responsibilities of client proxy 36 can be roughly divided into two categories: (a) translating and relaying information between client device 34 and management server 32 and (b) performing management functions that would otherwise normally be performed by client device 34.

Regarding the first of these two categories, client proxy 36 obtains or receives current configuration information from client device 34 in a format that is not compatible with the formats and protocols used by configuration management system 32, converts at least portions of the configuration information to a format that is compatible with configuration management system 32, and provides or reports the configuration information to configuration management system 32 on behalf of client device 34 in the format expected by the management system.

The configuration information includes a software inventory that identifies applications available on the client device. More specifically, the software inventory comprises a list of package IDs corresponding to packages that the client device has already been instructed to either install or to make available at the option of the client device's user. The configuration information also includes a hardware inventory.

In the described embodiment, configuration information communicated from client device 34 to client proxy 36 is formatted as XML data in accordance with an XML data schema, an example of which will be set forth in subsequent portions of this discussion.

Regarding the second category—performing management functions—client proxy 36 communicates with management server 32 to receive or obtain policies. As discussed above, policies indicate configuration settings and/or software packages that are available for download and installation, and also include information indicating which types of clients should download and implement the indicated configuration settings or download and install the indicated software packages. Client proxy 36 receives the policies from configuration management system 32, determines whether any of the policies apply to client device 34, and instructs the client device. Specifically, client proxy instructs the client device to download and execute one or more configuration change instructions or to download, install, and/or remove one or more applications in accordance with any of the policies that are determined to apply to the client device. The instructions provided to the client device can indicate conditions under which an application or a set of configuration change instructions should be downloaded, as well as a URL (uniform resource locator) from which they can be downloaded.

Figure 4:
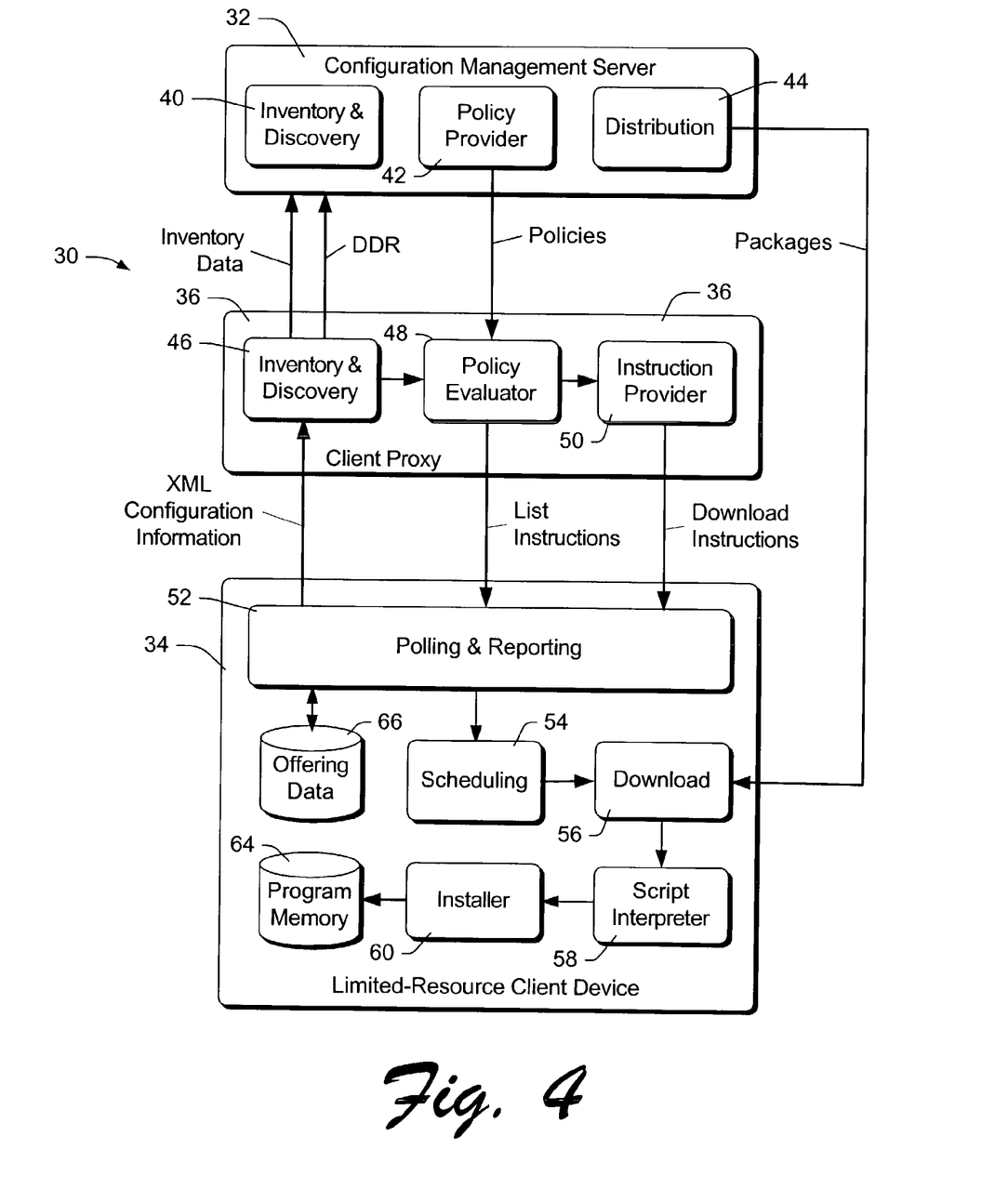
FIG. 4 is a block diagram showing logical components of a configuration management server, client computer, and client proxy as used in a system such as the one shown in FIG. 3.

FIG. 4 shows logical components of system management framework 30 in more detail. Management server system 32 includes an inventory and discovery component 40, a policy provider 42, and an application or package distribution component 44.

Inventory and discovery component 40 receives discovery data records and hardware and software inventories from multiple client computers for purposes of asset management. This information is typically stored in a database (not shown) that is accessible by system administrators.

Policy provider 42 distributes policies to the computers and other devices managed by server system 32. Policies indicate configuration settings or software packages that are available for download and installation, and also include information indicating which types of clients the policies apply to. A software package is a collection of files, along with instructions for downloading and installing the files.

Distribution component 44 is a connection point to which clients can connect to download applications, packages, or configuration change instructions.

Logical components of client proxy 36 include an inventory and discovery component 46, a policy evaluator 48, and an instruction provider 50. Inventory and discovery component 46 interacts with client device 34 to obtain information about the client device's configuration, including hardware and software inventories. The hardware and software inventories received from limited-resource client device 34 are greatly simplified as compared to inventories that might be produced by other types of clients such as full-functioned desktop computers. Inventory and discovery component 46 formats this simplified information in accordance with the communications protocols utilized by management server system 32, and communicates the information to management server system 32 in the form of hardware and software inventories and discovery data records (DDRs).

Policy evaluator 48 receives policies from policy provider 42 of management server system 32 and evaluates the policies to determine which are targeted to client device 34. When policy evaluator 48 determines that a policy is directed to client device 34, it directs instruction provider component 50 to provide download or configuration change instructions to client device 34 specifying how, and optionally under what conditions, to download the application, package, or set of configuration instructions that are the subject of the policy.

Logical components of client device 34 include a polling and reporting component 52, a scheduling component 54, a download component 56, an installation instruction interpreter 58, and a program or package installation component 60. These components can be implemented with special purpose software installed on the client device and preconfigured with information such as a URL or other specification regarding client proxy 36, as well as authentication information and credentials. Because of the limited functionality and resources of client device 34, this special-purpose software is limited in its scope and functionality as compared to standard client-side software that might be used on full-functioned desktop computers. This will become more apparent as the discussion proceeds.

The client device also has program memory 64 into which applications are installed, and a database or other data structure 66 in which client device 34 maintains an offering list indicating applications or packages that have already been made available to the client device through previous interactions with client proxy 36. The interaction of these components with each other and with client proxy 36 will be explained in more detail in the discussion which follows, with reference to FIG. 5.

Figure 5:
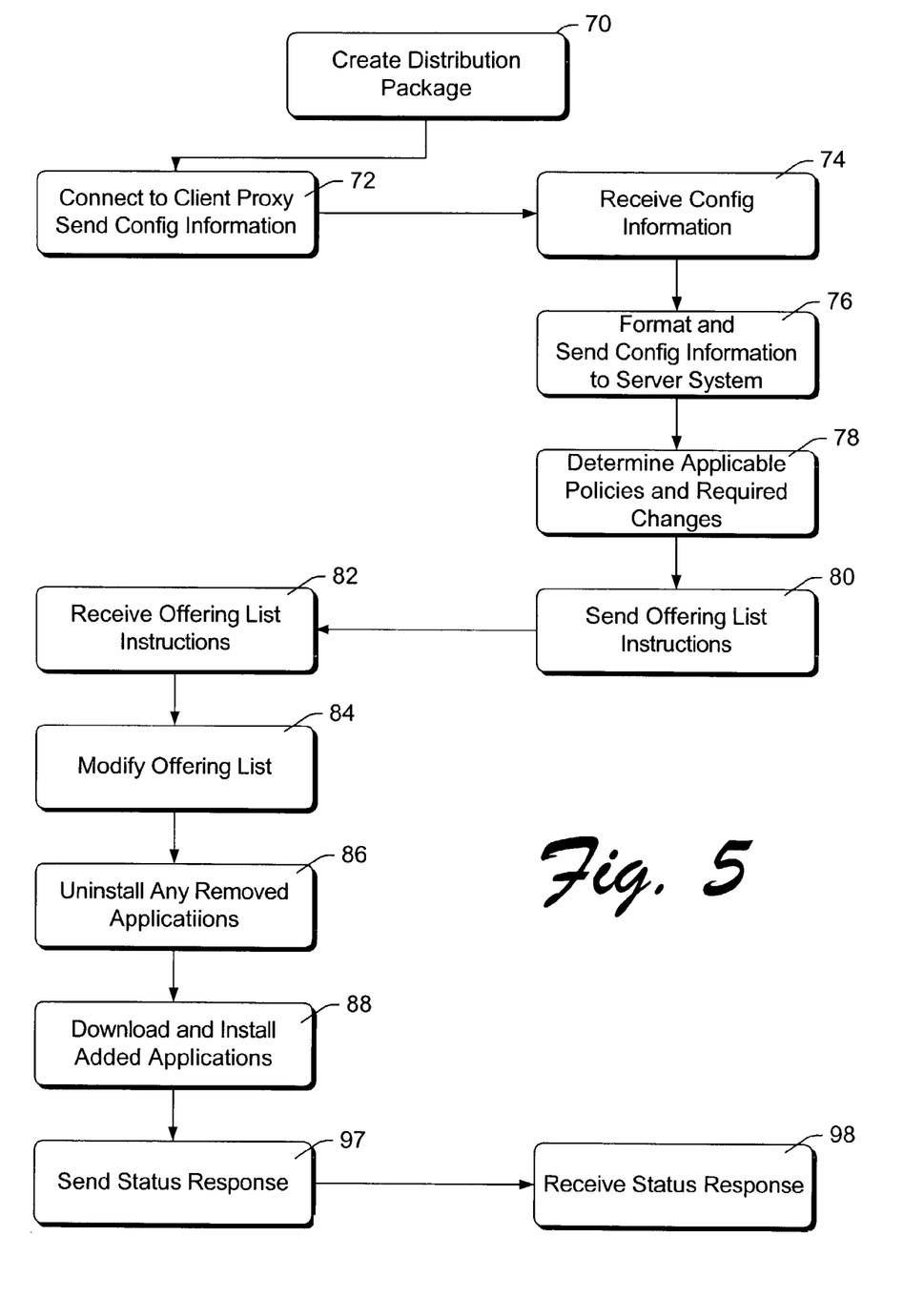
FIGS. 5 and 6 are block diagrams showing methodological aspects of the system management framework of FIGS. 3 and 4.

FIG. 5 shows methodological aspects of the framework shown in FIG. 4. Actions on the left-hand side of the figure are performed by components of client device 34. Actions on the right-hand side of the figure are performed by components of client proxy 36. Actions in the middle are performed by an administrator or by server system 32. The actions will be described with reference to a scenario where it is desired to distribute and install an application on all mobile devices. The example application has three components: foo.exe, foo.dll, and foo.reg. Installation on the client device involves copying the first two components to a directory called "\Program Files\Foo", and loading "foo.reg" into the registry of the client device.

An initial action 70 comprises creating a distribution package containing the three program components "foo.exe", "foo.dll", and "foo.reg". The package can comprise a so-called "CAB" file (a well known file type that combines multiple files into a single file for easy distribution), which can be opened by the receiving client device for automatic installation on the client device. Alternatively, a non-CAB package can be assembled, comprising the application components and a file containing an installation script that can be executed by the client device to perform the installation tasks. In this example, an installation script file is called "foo.cmd" and contains the following commands:

copy foo.exe "\program files\foo.exe"

copy foo.dll "\program files\foo.dll"

loadreg foo.reg delete foo.exe delete foo.dll delete foo.reg

This file will typically be created by a person acting as a system administrator.

At predetermined intervals as determined by scheduling component 54, polling and reporting component 52 performs an action 72 of connecting to client proxy 36 and sending configuration information. The configuration information includes various information about the client device's hardware and software, and includes a list of application packages, referred to herein as an offering list. The offering list identifies application packages, by package IDs, that the client device has been instructed to either install or to make available for installation. The package IDs are obtained from database 66, which is maintained based on instructions received from client proxy 36 as will be explained below. The offering list indicates all packages that client proxy 36 has instructed the client to make available.

The configuration information is preferably reported to client proxy 36 in accordance with an XML schema. Following is an example of such a schema:

| Element | Attribute | Description |
|---|---|---|
| devmgmt identity | | Parent element |
| | serialNumber | Unique identifier for the device (serial number etc.) |
| | deviceName | Name of the device |
| | userName | Username of current user (as specified in control panel, connection etc.) |
| | domain | Domain of current user (as specified in control panel, connection etc.) |
| devmgmt-sysinfo | | Parent element |
| | version | Version number of the SysInfo DLL |
| | type | Full or Delta |
| device | | |
| | class | The class of device |
| | modelDescription | Manufacturers model no etc. |
| | cpuType | StrongARM, MIPS etc. |
| | cpuArch | The cpu architecture |
| | cpuLevel | The cpu level |
| | ISA | The instruction set architecture |
| osVersion | | |
| | major | Major Version |
| | minor | Minor Version |
| | buildNum | Build Number |
| | CodePage | The default codepage of the client system as it shipped from the factory. |
| | localeID | The locale ID |
| binFile | | |
| | pid | |
| | ver | |
| | xipRegion | |
| screen | | |
| | hRes | Horizontal resolution in Pixels |
| | vRes | Vertical resolution in Pixels |
| | type | Color/black & white |
| | numColors | Colors if applicable, if not # grayscales |
| transport | | |
| | Ip | Current IP Address of device |
| | subnet | Current IP Address of device |
| | bandWidth | The speed of the connection communicating with the client proxy. This is to allow determining if the connection speed is sufficient to allow a particular type of download |
| | MAC | The MAC ID of the device |
| power | | |
| | AC | On AC power? |
| | battery | Battery charge status |
| | batteryPercent | Percent of battery life left |
| | backup | Backup Battery charge status |
| | backupPercent | Percent of backup battery life left |
| memory | | |
| | total | Installed memory (kb) |
| | program | Memory allocated to running apps (kb) |
| | programFree | Free Program Memory (kb) |
| | storage | Memory allocated to storage (kb) |
| | storageFree | Free Storage Memory (kb) |
| storage | | Parent element |
| filesystem | | |
| | name | Name of file system |
| | size | |
| | usedSpace | |
| packages | | Parent element |
| package | ID | Package identifier |

Below is an example of actual data formatted in accordance with the above XML schema, where boldface characters represent examples of variable data values. The XML data is typically communicated to client proxy 36 as an HTTP post:

```
DEVICE POST:
<devmgmt>
<identity deviceName="corpuser-ipaq" userName="corpuser"
    domain="NTDEV" />
<devmgmt-sysinfo version="1.0" type="full">
<ceDevice class="Pocket PC2" modelDescription="Compaq iPAQ
    H3600" cpuType="StrongARM" />
<osVersion major="3" minor="0" buildNum="9348"
    CodePage="1236">
<binFile pid="{13D65099-CE43-11D0-A2AD-0020357512E7}"
    ver="1.0" xipRegion="OS Core" />
<binFile pid="{23C46454-CE43-4650-AG7D-0145357512F8}"
    ver="1.6" xipRegion="Apps" />
</osVersion>
<screen vRes="240"" hRes="320" type="Color"
    numColors="65536" />
<transport ip="157.59.244.92" subnet="255.255.252.0"
    band Width="10000" />
<power AC="Connected" battery="High" batteryPercent="95"
    backup="High" backupPercent="100" />
<memory total="31944" program="15984" programFree="3584"
    storage="15960" storageFree="13002" />
<storage>
<fileSystem name="root" size="1002" usedSpace="500" />
<fileSystem name="backup" size="1462" usedSpace="700" />
<fileSystem name="data" size="150" usedSpace="120" />
</storage>
<packages>
<package ID="E9C4C404-A802-460b-B8AF-6BF1D72AF594" />
<package ID="4A9D1F33-76CC-42d2-93BE-F1D86B7FBA36" />
<package ID="2C0E13E1-4C20-4dc2-A80E-368FD63F986F" />
</packages>
</devmgmt-sysinfo>
</devmgmt>
```

The instances of the package ID attribute indicate package IDs as received from configuration management server system 32. The IDs may refer to "mandatory" packages or "optional" packages. Mandatory packages are those that are required by server system 32 to be installed on applicable client devices. Optional packages are those that are downloaded and installed only at a user's option. The offering list maintained and reported by the client device corresponds to all applicable mandatory and optional packages that the client device has been made aware of through previous interactions with client proxy 36.

Inventory and discovery component 46 of client proxy 36 receives the configuration information in and action 74. In response to receiving this information, client proxy performs actions 76 of formatting the information in a format expected by management server system 32 and sending the formatted information to the server system 32. Client proxy also maintains a mapping between the ID of the client device as received from the client device, and the ID assigned to the client device by management server system 12.

Policy evaluator 48 of client device 34 also receives the offering list, as well as receiving policies from management server system 32. Based on this information, client proxy 36 performs actions 78 of selectively applying the received policies to client device 34. This involves determining whether any of the policies apply to the client device and evaluating the received offering list in light of any such applicable policies to determine any changes that should be made by the client to its offering list. The evaluation involves determining whether packages should be added or removed from the offering list of the client device. As a result of this determination, policy evaluator 48 performs an action 80 of sending offering list instructions to client device 34, instructing it to change its offering list in accordance with the determined changes—to remove applications and/or to download and install packages in accordance with the policies received from management server 32. In the described implementation, the offering list instructions are sent in the following XML format, in which boldface characters represent exemplary data that will vary depending on the nature of the packages:

```
<RDM-Operation>
  <packages>
    <add>
      <package ID="FE046C21-9272-49e0-83D7-
            8975566184F0" Type="Mandatory" Name="Foo
            Program" Description="Latest Foo program"/>
    </add>
    <remove>
      <package ID="E9C4C404-A802-460b-B8AF-
            6BF1D72AF594" />
    </remove>
  <packages/>
</RDM-Operation>
```

Client device 34 receives the offering list instructions in action 82 and responds in an action 84 by parsing and executing the instructions to modify its offering list. In example above, the client device is instructed to add "Foo Program", specified by an enumerated package ID, to its offering list, and to remove another program that is also identified by its package ID.

After modifying its offering list, client device 34 detects any changes to the offering list and takes appropriate action. If one or more applications have been removed, they are uninstalled or removed in an action 86. If one or more applications have been added, they are downloaded and installed in an action 88.

Figure 6:
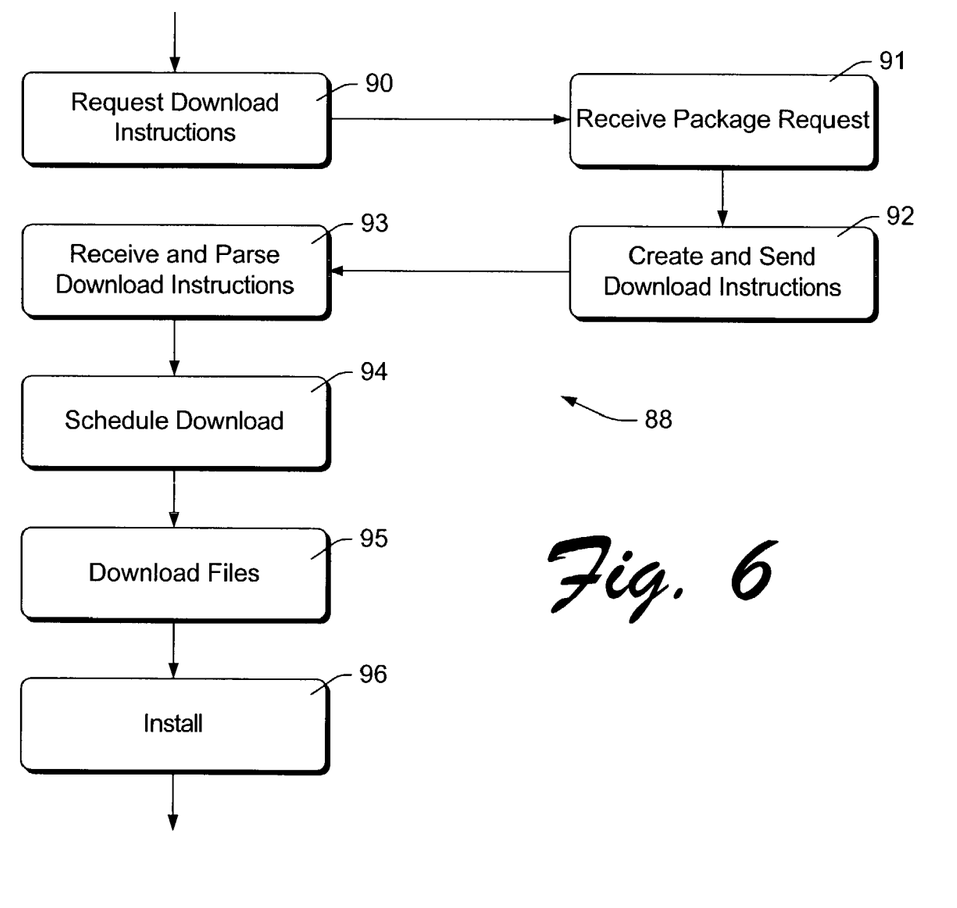

FIG. 6 shows details of action 88, of adding or installing a new program. After determining that a package needs to be installed, polling and reporting component 52 performs an action 90 of contacting client proxy 36 and requesting download instructions by submitting a package request. The package request identifies the package, by its package ID, that the client has identified as needing. Client proxy 36 receives the package request in action 91 and responds in an action 92 by creating or compiling a download instruction file and providing the download instruction file to client device 34. The download instruction file is preferably provided in an XML format.

The download instruction file includes various parameters relating to how, when, from where, and under what conditions the subject package should be downloaded. In the described embodiment, the parameters comprise the following:

Header
Contents Block
  ID (GUID)
  Response URL for Status reports (optional)
Download Instructions
  Start Time (in GMT)
  Delta Time (in GMT)
  Flags (Connection Type or Connection Class)
  Required (YES or NO. default: NO)
  File description(s)
    Source URL Destination on the Device (file location as a fully qualified path)

Signature (Signed hash of the file)

Command to run on the device after download (optional)

The "contents" block contains information regarding the content of the instruction file itself, including a URL to which the client should report success or failure of the subsequently enumerated actions. The "download instructions" specify either a "start time" or a "delta time" (an interval after which the operations should start), as well as "flags" indicating conditions under which the download should be allowed to proceed. For example, the flags might indicate that the download is to be initiated only when certain communications capabilities are present, such as being connected to a network over a high-speed network. As another example, the flags might indicate that a download is to be initiated only when the client device is connected to AC power (as opposed to battery power).

The "required" parameter indicates whether the package is required to be installed on the device by management server 32. The "file description(s)" indicate source and destination locations of file that are to be copied to the client device, as well as signatures of the files. The "command" parameter identifies a command that is to be executed by the client device after successfully copying the files previously specified in the instruction file.

Following is an example of an XML download instruction file, where boldface characters are variable data values:

```
DOWNLOAD XML MESSAGE:
<RDM-Operation>
<Authorization SourceGUID="66CC03B9-6C89-45e3-94C5-
        4213925B7B21" Signature="Foo Bar" />
<Contents Action="Create" ID="FE046C21-9272-49e0-83D7-
        8975566184F0"
        ResponseUrl="https://server/device.dll?status">
<Description SourceName="Server" OfferingName="Foo Program">
        <ShortDescription>"Latest Foo program"</ShortDescription>
</Description>
    <Download StartTime="d0 07 0a 00 03 00 12 00 00 00 2a 00 05 00
        00 00" DeltaTime="00 00 01 00 00 00 00
        00 00 00 00 00 00 00
        00 00" RetryTime="00 00 01 00 00 00 00
        00 00 00 00 00 00 00
        00 00" MaxRetryCount="5"
        Type="Download" Flags="05 00
        00 00" RequireUrlSigs="0"
        NotificationType="MandatorySilent">
    <CopyFile Url="https://server/drop/foo.exe"
        Dest="\temp\foo.exe"/>
    <CopyFile Url=https://server/drop/foo.dll
        Dest="\temp\foo.dll" />
    <CopyFile Url="https://server/drop/foo.reg"
        Dest="\temp\foo.reg"/>
    <CopyFile Url"https://server/drop/foo.cmd"
        Dest="\temp\foo.cmd" />
    <PostInstall Command="\temp\foo.cmd" />
</Download>
</Contents>
    </RDM-Operation>
```

Client device 34 receives and parses the received download instruction file and in an action 94 schedules the download instructions with scheduling component 54 for execution in accordance with the start time, delta time, and/or flags associated with the instructions. At the appropriate time, the scheduler instructs download component 56 to performs an action 95 of downloading the files described in the download instruction file. A subsequent action 96, performed by instruction interpreter 58, comprises executing the command(s) indicated by the "command" parameter of the download instruction file, which in most cases will initiate installation of the downloaded files by installation component 60. In the given example, this command comprises the "foo.cmd" script described earlier in this document. Executing "foo.cmd" comprises executing its individual instructions, which perform any necessary installation tasks—in the given example, copying files to appropriate directories on the client device, loading registry values, and deleting temporary files.

Returning to FIG. 5, after adding or removing from its program list, or after installing a program or package, client device 34 performs an action 97 of sending a status response to client proxy 36, indicating the success (or failure) of the operation. The status response is preferably formatted as XML data, and indicates the package IDs of any packages that have been downloaded, installed, and/or removed. For example, an XML status response might appear as follows, where boldface characters represent variable data:

```
<Status>
    <response code="100" ID="E587E5D6-7160-4b8e-A3D9-
        041B85568704" Type="Download" />
    <response code="100" ID="E587E5D6-7160-4b8e-A3D9-
        041B85568704" Type="Install" />
</Status>
```

Client proxy 36 receives and processes the status response in an action 98.

In addition to the specific functionality described in detail above, client proxy 36 performs other functionality to support management of client device 52. In particular, client proxy 36 responds to status requests and other communications on behalf of client device 34. In addition, it is possible for client proxy to initiate more extensive reporting by client device 34, by instructing the client device to download, install, and/or execute specific reporting applications.

Figure 7:
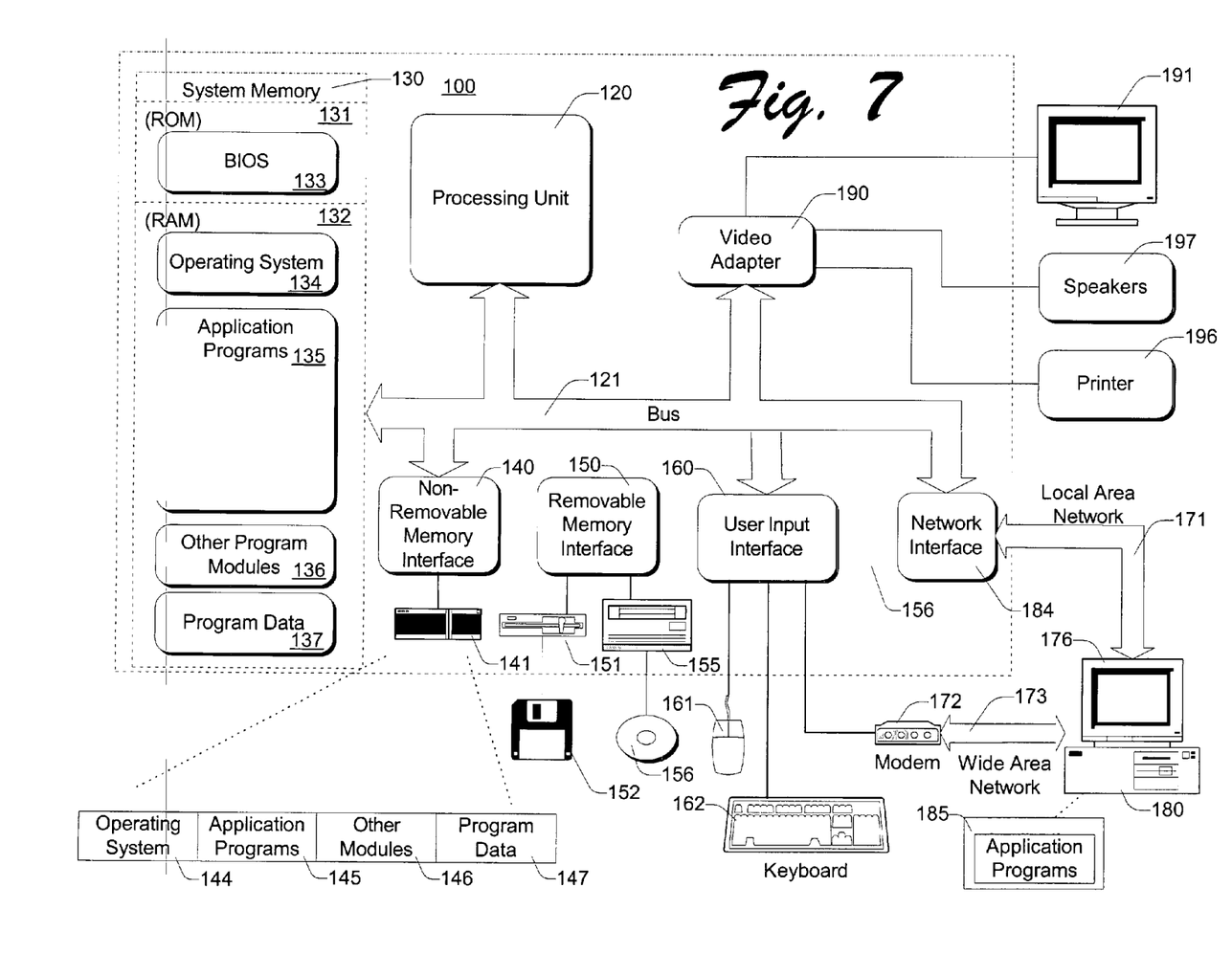
FIG. 7 is a block diagram illustrating computer components, subsets of which can be used to implement the various portions of logical functionality described herein.

The server and client proxy components and functionality described above are implemented with one or more individual computers. FIG. 7 shows components of typical example of such a computer, referred by to reference numeral 100. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, laptop devices, multiprocessor systems, microprocessor-based systems, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps and actions described above in conjunction with microprocessors or other data processors. The invention also includes the computer itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media include both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 100 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 7 provide storage of computer-readable instructions, data structures, program modules, and other data for computer 100. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Limited resource client device 34 is implemented using technologies similar to those shown in FIG. 7, albeit on a more limited scale. Furthermore, a limited-resource client device such as a PDA, cell phone, etc. typically does not possess all the functionality illustrated in FIG. 7. For example, a limited-resource client often does not have drives for removable magnetic media such as floppy disks or CD-ROMs. Such clients typically have much less memory capacity, smaller display devices and keyboards, slower or less capable processors. Furthermore, many such devices have electronic flash memory in place of a hard disk. In addition, limited-resource devices typically run an operating system that does not have the full set of features supported by desktop operating systems. For example, limited-resource devices might run the Windows CE® operating system, rather than the Windows XP® operating system.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system management framework comprising:
    a configuration management system configured to communicate with and manage multiple compatible client computers; and
    a client proxy separate from the configuration management system, configured to communicate with a client device, wherein the client device cannot directly communicate with and is not directly managed by the configuration management system, the client proxy being implemented apart from the client device and being further configured to communicate with the configuration management system and to emulate a compatible client computer on behalf of the client device to allow the configuration management system to manage the client device.

2. A system management framework as recited in claim 1, wherein the client proxy is configured to receive configuration information from the client device and to report the received configuration information to the configuration management system.

3. A system management framework as recited in claim 1, wherein the client proxy is configured to receive configuration information from the client device in a format that is not compatible with the configuration management system and to provide the received configuration information to the configuration management system in a format that is compatible with the configuration management system.

4. A system management framework as recited in claim 1, wherein the client proxy is configured to receive configuration information from the client device in accordance with an XML schema and to report the received configuration information to the configuration management system.

5. A system management framework as recited in claim 1, wherein the client proxy is configured to receive hardware and software inventories from the client device and to report the received hardware and software inventories to the configuration management system.

6. A system management framework as recited in claim 1, wherein the client proxy comprises a policy evaluator that receives policies from the configuration management system, determines whether any of the policies apply to the client device, and instructs the client device in accordance with any of the policies that ate determined to apply to the client device.

7. A system management framework as recited in claim 1, wherein the client proxy comprises a policy evaluator that receives policies from the configuration management system, determines whether any of the policies are applicable to the client device, and instructs the client device to download one or more applications in accordance with any of the policies that are determined to be applicable to the client device.

8. A system management framework as recited in claim 1, wherein the client proxy comprises a policy evaluator that receives policies from the configuration management system, determines whether any of the policies are applicable to the client device, and instructs the client device to download one or more configuration change instructions in accordance with any of the policies that are determined to be applicable to the client device.

9. A system management framework as recited in claim 1, wherein the client proxy comprises a policy evaluator that receives policies from the configuration management system, determines whether any of the policies apply to the client device, and instructs the client device to install one or more applications on the client device in accordance with any of the policies that are determined to apply to the client device.

10. A system management framework as recited in claim 1, wherein the client proxy comprises a policy evaluator that receives policies from the configuration management system, determines whether any of the policies apply to the client device, and instructs the client device to make one or more configuration changes on the client device in accordance with any of the policies that are determined to apply to the client device.

11. A system management framework as recited in claim 1, wherein the client proxy comprises a policy evaluator that receives policies from the configuration management system, determines whether any of the policies apply to the client device, and instructs the client device to download and install one or more applications in accordance with any of the policies that are determined to apply to the client device.

12. A system management framework as recited in claim 1, wherein the client proxy comprises a policy evaluator that receives policies from the configuration management system, determines whether any of the policies apply to the client device, and instructs the client device to download and execute configuration change instructions in accordance with any of the policies that are determined to apply to the client device.

13. A system management framework as recited in claim 1, wherein the client proxy comprises a policy evaluator that receives policies from the configuration management system, determines whether any of the policies apply to the client device, and instructs the client device to remove one or more applications in accordance with any of the policies that are determined to apply to the client device.

14. A system management framework as recited in claim 1, wherein the client proxy is configured to perform actions comprising:
   receiving a list of applications from the client device;
   receiving policies from the configuration management system;
   examining the list of applications in light of the received policies to determine changes that should be made to the list of applications;
   instructing the client device to change its list of applications in accordance with the determined changes.

15. A system management framework as recited in claim 1, wherein the client proxy is configured to perform actions comprising:
   receiving a current configuration from the client device;
   receiving policies from the configuration management system;
   examining the received current configuration in light of the received policies to determine changes that should be made to the current configuration;
   instructing the client device to change its configuration in accordance with the determined changes.

16. A method as recited in claim 1 wherein the proxy component is configured to receive a package request from the client device and in response to return download instructions that can be executed by the client device to download an application package.

17. A system management framework as recited in claim 1, wherein the client proxy is configured to perform actions comprising:
   receiving a list of applications from the client device;
   receiving policies from the configuration management system;
   examining the list of applications in light of the received policies to determine changes that should be made to the list of applications;
   instructing the client device to change its list of applications in accordance with the determined changes;
   receiving a package request from the client device; and
   in response to receiving the package request, returning download instructions that can be executed by the client device to download an application package.

18. A system management framework as recited in claim 1, further comprising a client device that maintains a list of applications, wherein:
   the client device provides the list of applications to the client proxy;
   the client proxy examines the list of applications in light of policies obtained from the configuration management system to determine changes that should be made to the client's list of applications;
   the client proxy instructs the client device to change its list of applications in accordance with the determined changes;
   the client device submits a package request corresponding to an application added to the client's list of applications; and
   the client proxy responds to the package request by returning download instructions that can be executed by the client device to download an application package.

19. One or more computer-readable media containing instructions to implement a client proxy for use in conjunction with a configuration management system, wherein the client proxy is separate from the configuration management system, wherein the client proxy is separated from the configuration management system, the instructions being executable by a computer to perform actions comprising:
   communicating with a client device that cannot directly communicate with and is not directly managed by the configuration management system;
   obtaining configuration information from the client device, wherein the configuration information identifies applications available on the client device;
   emulating a compatible client computer on behalf of the non-compatible client device to allow the configuration management system to add and remove applications to and from those available on the non-compatible client device.

20. One or more computer-readable media as recited in claim 19, the actions further comprising:
   reporting at least portions of the configuration information to the configuration management system in a format that is compatible with the configuration management system.

21. One or more computer-readable media as recited in claim 19, the actions further comprising:
   receiving the configuration information from the client device in a format that is not compatible with the configuration management system; and
   reporting at least portions of the configuration information to the configuration management system in a format that is compatible with the configuration management system.

22. One or more computer-readable media as recited in claim 19, wherein the configuration information further comprises hardware and software inventories of the client device, the actions further comprising reporting the received hardware and software inventories to the configuration management system on behalf of the client device.

23. One or more computer-readable media as recited in claim 19, the actions further comprising:
   receiving policies from the configuration management system;
   determining whether any of the policies apply to the client device; and
   instructing the client device in accordance with any of the policies that are determined to apply to the client device.

24. One or more computer-readable media as recited in claim 19, the actions further comprising:
   receiving policies from the configuration management system;
   determining whether any of the policies apply to the client device; and
   instructing the client device to download and install one or more applications in accordance with any of the policies that are determined to apply to the client device.

25. One or more computer-readable media as recited in claim 19, the actions further comprising:
- receiving policies from the configuration management system;
- determining whether any of the policies apply to the client device; and
- instructing the client device to download and execute configuration change instructions in accordance with any of the policies that are determined to apply to the client device.

26. One or more computer-readable media as recited in claim 19, the actions further comprising:
- receiving policies from the configuration management system;
- determining whether any of the policies apply to the client device; and
- instructing the client device to remove one or more applications in accordance with any of the policies that are determined to apply to the client device.

27. One or more computer-readable media as recited in claim 19, the actions further comprising:
- receiving policies from the configuration management system;
- examining the identification of applications available on the client device in light of the received policies to determine changes that should be made regarding the applications that are available on the client device;
- instructing the client device to change its applications that are available in accordance with the determined changes.

28. One or more computer-readable media as recited in claim 19, the actions further comprising:
- receiving a package request from the client device;
- in response to the package request, returning download instructions that can be executed by the client device to download an application package.

29. One or more computer-readable media as recited in claim 19, the actions further comprising:
- receiving policies from the configuration management system;
- examining the identification of applications available on the client device in light of the received policies to determine changes that should be made regarding the applications that are available on the client device;
- instructing the client device to change its applications that are available in accordance with the determined changes;
- receiving a package request from the client device; and
- in response to the package request, returning download instructions that can be executed by the client device to download an application package.

30. A method of including a limited-resource client device in the management framework of a configuration management system, the method comprising:
- communicating with the limited-resource client device that cannot directly communicate with and is not directly managed by the configuration management system, to obtain configuration information regarding its configuration;
- emulating a non-limited-resource client computer on behalf of the limited-resource client device to allow the configuration management system to manage the configuration of the client device; and
- wherein the emulating comprises selectively applying policies received from the configuration management system to the limited-resource client device.

31. A method as recited in claim 30, wherein:
- the configuration information identifies applications available on the limited-resource client device; and
- said selectively applying comprises instructing the limited-resource client device to add applications to and/or remove applications from those available on the limited-resource client device.

32. A method as recited in claim 30, further comprising reporting at least portions of the configuration information to the configuration management system in a format that is compatible with the configuration management system.

33. A method as recited in claim 30, further comprising:
- receiving the configuration information from the limited-resource client device in a format that is not compatible with the configuration management system; and
- reporting at least portions of the configuration information to the configuration management system in a format that is compatible with the configuration management system.

34. A method as recited in claim 30, wherein the configuration information comprises hardware and software inventories of the limited-resource client device, the method further comprising reporting the received hardware and software inventories to the configuration management system on behalf of the limited-resource client device.

35. A method as recited in claim 30, wherein the selectively applying policies comprises instructing the limited-resource client device to download and install one or more applications in accordance with any of the policies that are determined to apply to the limited-resource client device.

36. A method as recited in claim 30, wherein the selectively applying policies comprises instructing the limited-resource client device to make one or more configuration changes in accordance with any of the policies that are determined to apply to the limited-resource client device.

37. A method as recited in claim 30, wherein the selectively applying policies comprises instructing the limited-resource client device to remove one or more applications in accordance with any of the policies that are determined to apply to the limited-resource client device.

38. A method as recited in claim 30, further comprising:
- receiving a package request from the limited-resource client device;
- in response to the package request, returning download instructions that can be executed by the limited-resource client device to download an application package.

* * * * *